(12) United States Patent
Pfeffinger et al.

(10) Patent No.: US 6,772,715 B2
(45) Date of Patent: Aug. 10, 2004

(54) COOLING CIRCUIT OF A LIQUID-COOLED INTERNAL COMBUSTION ENGINE

(75) Inventors: Harald Pfeffinger, Tiefenbronn (DE); Heiko Sass, Tamm (DE)

(73) Assignee: DaimlerChrysler A.G., Stuttgart (DE)

( * ) Notice: Subject to any disclaimer, the term of this patent is extended or adjusted under 35 U.S.C. 154(b) by 0 days.

(21) Appl. No.: 10/319,168

(22) Filed: Dec. 13, 2002

(65) Prior Publication Data

US 2003/0116105 A1 Jun. 26, 2003

(30) Foreign Application Priority Data

Dec. 15, 2001 (DE) .......................................... 101 61 851

(51) Int. Cl.[7] .............................................. F01P 11/08
(52) U.S. Cl. ................................. 123/41.31; 123/41.33
(58) Field of Search .......................... 123/41.31, 41.33, 123/196 AB

(56) References Cited

U.S. PATENT DOCUMENTS 3,315,464 A  *  4/1967  Hayden ........................ 60/329
3,752,222 A  *  8/1973  Olbermann, Jr. ............ 165/280
6,427,640 B1 *  8/2002  Hickey et al. ........... 123/41.31
6,536,381 B2 *  3/2003  Langervik ................. 123/41.33

FOREIGN PATENT DOCUMENTS

| DE | 905459 | * | 3/1954 | |
| DE | 3403425 A1 | * | 8/1984 | |
| EP | 0 736 703 A1 | * | 10/1996 | |
| JP | 11264318 A | * | 9/1999 | ............ F01P/11/08 |

* cited by examiner

Primary Examiner—Noah P. Kamen
(74) Attorney, Agent, or Firm—Klaus J. Bach

(57) ABSTRACT

In a cooling circuit of a liquid-cooled internal combustion engine of a motor vehicle having a coolant pump, an electrical mixing valve, a radiator, a heater, an engine-oil heat exchanger, a transmission-oil cooler for transferring heat to the ambient air, a transmission-oil/cooling water heat exchanger for transferring heat between the transmission oil and the cooling water arranged in parallel flow circuit with the transmission-oil cooler, and an actuator for controlling the oil flow distribution, an electrical mixing valve is arranged in the cooling water line to the radiator/transmission-oil cooler and the transmission-oil/cooling water heat exchanger, such that the heat transfer in the transmission-oil/cooling water heat exchanger can be controlled by controlling the coolant flows through the transmission oil/cooling water heat exchanger and the radiator.

8 Claims, 4 Drawing Sheets

COOLING CIRCUIT OF A LIQUID-COOLED INTERNAL COMBUSTION ENGINE

BACKGROUND OF THE INVENTION

The invention relates to a cooling circuit of a liquid-cooled internal combustion engine having a coolant pump, an electrical mixing valve, a radiator, a heater and transmission oil heat exchangers.

Page 156 of the text book Braess/Seiffert: Vieweg Handbuch Kraftfahrzeugtechnik; $1^{st}$ Edition; October 2000, shows a cooling circuit which is customary for motor vehicles, and which includes a main cooling circuit of an internal combustion engine including a mixing valve (thermostat), a radiator and a coolant pump. The coolant is pumped into the internal combustion engine by the coolant pump, takes up heat in the internal combustion engine, and, at the thermostat, is returned to the internal combustion engine if the coolant is still cool. If the coolant is hot, it is conducted through the radiator in order to dissipate heat. Then, the coolant flows back to the internal combustion engine. The position of the thermostat in the circuit is upstream or downstream of the radiator. In addition, there are also one or more sub-circuits with a heater for heating the interior of the vehicle, an oil-water heat exchanger for heating the engine oil of the internal combustion engine during cold operating states or cooling the engine oil during hot operating states. In addition, the sub-circuit may also include a heat exchanger for the transmission oil, a cooler for the exhaust-gas re-circulation and, under certain circumstances, also a charge air cooler. Moreover, it is known to electrically actuate the mixing valve (thermostat).

It is the object of the present invention to provide a cooling circuit of an internal combustion engine with a transmission of a motor vehicle by which the fuel consumption and the exhaust emissions of the motor vehicle are reduced during operation, in particular during the engine warm-up phase.

SUMMARY OF THE INVENTION

In a cooling circuit of a liquid-cooled internal combustion engine of a motor vehicle having a coolant pump, an electrical mixing valve, a radiator, a heater, an engine-oil heat exchanger, a transmission-oil cooler for transferring heat to the ambient air, a transmission-oil/cooling water heat exchanger between the transmission oil and the cooling water arranged in parallel flow circuit with the transmission-oil cooler, and an actuator for controlling the oil flow, an electrical mixing valve is arranged in the cooling water line to the radiator/transmission-oil cooler and the transmission-oil/cooling water heat exchanger, such that the heat transfer in the transmission-oil/cooling water heat exchanger can be controlled by controlling the coolant flow through the transmission oil/cooling water heat exchanger and the radiator.

By means of the actuator, the oil flow of the transmission is distributed as a function of the quantity and direction of the heat flux in the oil. If the transmission oil is cold, the whole oil flow is conducted through the transmission-oil/cooling water heat exchanger, so that the transmission oil is heated by the engine-cooling water. Rapid heating of the transmission oil reduces the friction in the transmission and therefore the overall fuel consumption of the motor vehicle. When the transmission oil is hot, the transmission oil is passed to the transmission-oil cooler, by switching over the actuator, in order to dissipate the heat to the environment and to prevent overheating of the oil. If the transmission oil is hotter than the engine oil, as it may occur, for example, during prolonged periods of driving downhill, the actuator is used to direct the transmission oil flow to the transmission-oil heat exchanger, in order to control the temperature of the engine oil.

Moreover, the heat transfer in the transmission-oil heat exchanger can be controlled by the fact that the cooling-water stream through the transmission-oil heat exchanger can be controlled by means of the electric mixing valve. Controlling the cooling-water flow through the transmission-oil heat exchanger allows better matching of the heat transfer from the transmission oil to the cooling water or vice versa, since, by setting different quantitative flows of cooling water with an approximately constant quantitative flow of transmission oil, it is possible to set the required heat transfer to the cooling water without dissipating heat to the environment via the transmission-oil cooler.

In a particular embodiment of the invention, the actuator is controlled as a function of various operating parameters, such as ambient temperature, cooling-water temperature, driving speed or engine speed. This makes it possible to control the heat transfer as required.

In a further embodiment of the invention, the actuator is controlled as a function of the temperature of the transmission oil. The actuator may simply be controlled as a function of temperature, for example, by means of a temperature-dependent expansion regulator (thermostat). This is a simple and inexpensive option for implementing the actuator for transmission-oil distribution.

In a further advantageous embodiment of the invention, the actuator can be controlled by a control unit. If a plurality of parameters are to be included in the control characteristic, it is advantageous for them to be controlled jointly by a common control unit. This allows regulation on the basis of a parameter-dependent characteristic diagram, in order to allow heat transfer, which is optimized with regard to consumption and emissions of the motor vehicle.

In a favorable embodiment of the invention, the actuator is arranged downstream of the transmission-oil cooler and the transmission-oil heat exchanger. In this case, the actuator is arranged at the point at which the two partial streams from the transmission-oil cooler and the transmission-oil heat exchanger join to form a common oil return line. Arranging the actuator downstream of the heat-releasing or heat-absorbing components allows good regulation, known as output regulation, of the transmission-oil temperature, since the actual temperature of the oil flowing back can be accurately controlled.

As an alternative hereto, an embodiment of the invention with the actuator upstream of the branch to the transmission-oil cooler and transmission-oil heat exchanger is possible. This embodiment is known as input regulation and, although having a slightly lower regulation quality than output regulation, offers a variant, which may be required under certain circumstances for reasons of lack of installation space.

In a further favorable embodiment of the invention, the cooling-water side of the transmission-oil heat exchanger is connected in parallel with the radiator. In this embodiment the transmission-oil heat exchanger is arranged in what is known as the short-circuit line between the electrical mixing valve and the coolant pump. This short-circuit line is already present in the cooling-water circuit, and therefore no additional structural outlay is required. The electrical mixing valve allows the cooling-water flow in the transmission-oil heat exchanger to be controlled in addition to the oil flow.

With this arrangement, it is possible, for example in the warm-up phase, to direct all the cooling-water through the transmission-oil heat exchanger, in order to provide for rapid heating of the transmission oil.

In a further alternative embodiment of the invention, the cooling-water side of the transmission-oil heat exchanger is connected in series with the heater in a subcircuit. An engine-oil heat exchanger may be connected in parallel or in series with the transmission-oil heat exchanger. With this arrangement, the transmission oil can be at least partially heated even when the short-circuit cycle is completely closed during the starting phase of the internal combustion engine. Even in the cold-start phase, some—although under certain circumstances only a very small amount—of the cooling water flows through the heating circuit. This allows heat transfer from the heated cooling water to the engine oil and the transmission oil, so that the friction in the internal combustion engine and in the transmission is reduced by the heated oil.

Further features and combinations of features will become apparent from the following description of the invention on the basis of the accompanying drawings.

DESCRIPTION OF A PREFERRED EMBODIMENT

Figure 1:
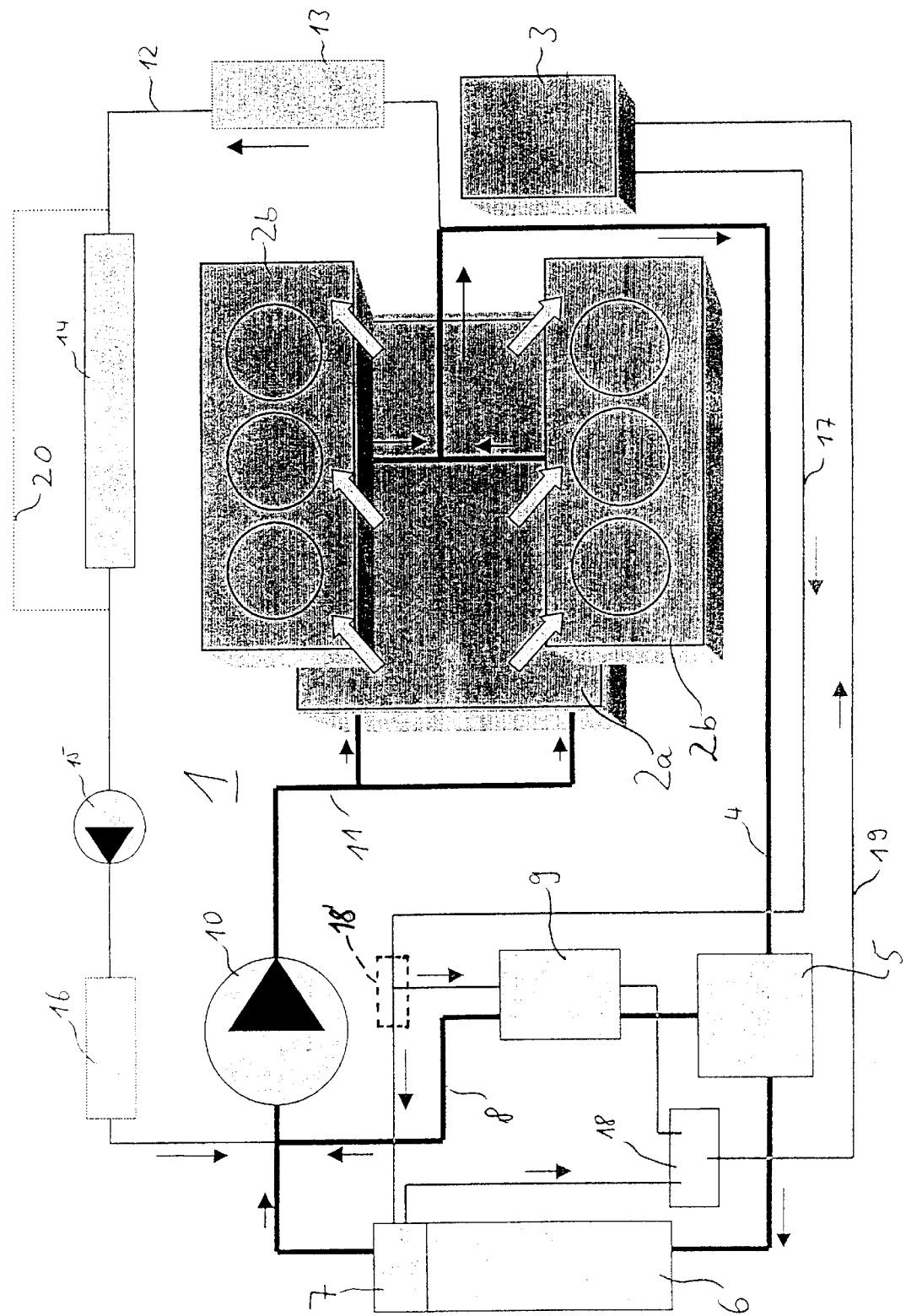
FIG. 1 shows a cooling circuit diagram of an internal combustion engine with a transmission-oil heat exchanger, which is connected in parallel with the radiator.

FIG. 1 depicts a cooling circuit 1 of an internal combustion engine 2a, 2b with a transmission 3 in a motor vehicle (not shown). The cooling water flows from the engine block 2a of the internal combustion engine via the cylinder head 2b and the coolant feed line 4 to the electrical mixing valve 5. From the electrical mixing valve 5, the cooling water, depending on the position of the electrical mixing valve, flows either via the radiator 6 and the transmission-oil cooler 7 or in the short-circuit line 8 through the transmission-oil heat exchanger/cooling water 9 to the water pump 10. The water pump 10 is mechanically or electrically driven and is designed to be switchable. From there, the cooling water is pumped through the return line 11 to the engine block 2a. Furthermore, the cooling circuit 1 also comprises a heating circuit 12, which

- branches off in the cylinder head 2b or from the coolant feed line 4,
- extends through an EGR cooler 13 for exhaust gas which is to be re-circulated,
- extends through a heater 14 for the vehicle heating system,
- an optional electrical additional water pump 15,
- an engine-oil heat exchanger 16 and
- the water pump 10.

A bypass line 20 may be provided for bypassing the heater 14, at high outside temperatures at which heating of the passenger compartment is not required.

The transmission oil flows in a transmission-oil circuit including a feed line 17 and is directed to the transmission-oil cooler 7 and/or the transmission-oil/cooling water heat exchanger 9. After passing through these two elements, the oil flows are combined in the actuator 18 and flow back to the transmission 3 in the transmission-oil return line 19.

By adjustment of the electrical mixing valve 5, the actuator 18, the water pump 10 and the additional electrical water pump 15, different cooling-water and transmission-oil flows can be provided as a function of the operating state of the internal combustion engine 1 and of the transmission 3. There are the following operating states: the internal combustion engine 1 and the transmission 3 are cold, i.e. the internal combustion engine and the transmission are in a state, which immediately follows a cold start. In this operating state, the cooling water is stationary or only flows with a low volumetric flow, set in motion by the water pump 10 or the electrical additional water pump 15. At the start, the electrical mixing valve 5 is completely closed, and water flows only via the heating circuit 12 if the electrical additional pump 15 is switched on. Heat from the cooling water, of which there is only a small amount, is dissipated via the heater 14 to the vehicle interior and via the engine-oil heat exchanger 16 to the engine oil. The actuator 18 is positioned in such a way that the transmission oil flows through the transmission-oil/cooling water heat exchanger 9. Since no cooling water flows through the closed electrical mixing valve 5, no heat is transferred in the transmission-oil heat exchanger 9, i.e. the transmission-oil flow is short circuited and the transmission oil is not cooled.

If the internal combustion engine 2a, 2b is already warm but the transmission 3 is still cold, it is advantageous for the overall efficiency of the vehicle if the transmission oil is heated quickly using waste heat from the internal combustion engine, in order to reduce the friction by the transmission oil, which, at this point, has a low viscosity. In this case, the water pump 10 actuated and the electrical mixing valve 5 opens the short-circuit line 8, so that hot cooling water flows through the transmission-oil/cooling water heat exchanger 9. The electrical mixing valve 5 is only opened sufficiently for enough cooling water to flow through the heating circuit 12 to supply the heater 14 and the engine-oil heat exchanger 16 with heat, while the remaining cooling water flows through the short-circuit line 8. The actuator 18 is set in such a way that the transmission oil flows through the transmission-oil/cooling water heat exchanger 9. In this way, during the cold start, the various heat-absorbing locations in the cooling circuit are heated according to their heat consumption but also according to their priority. For example, the internal combustion engine for functional reasons, and the vehicle heater for comfort reasons, are preferentially supplied with heat rather than the transmission, which, during a cold start is briefly operated with a higher level of friction on account of the cooler oil. Once the engine oil is hot but the transmission oil is still cold, the cooling-water flow through the transmission-oil heat exchanger 9 is increased by the electrical mixing valve 5, and in this way more heat is transferred to the transmission oil.

As the cooling-water temperature rises, the electrical mixing valve 5 opens the cooling circuit via the radiator 6, in order to prevent the cooling water from becoming too hot, but the short-circuit cycle 8 through the transmission-oil/ cooling water heat exchanger 9 remains at least partially open, in order to allow heat transfer to the transmission oil.

When, or just before, the transmission oil reaches the maximum permissible temperature, the actuator 18 switches over, and the transmission oil flows through the transmission-oil cooler 7, where it is cooled. The electrical mixing valve 5 then directs all the cooling water to the radiator 6.

If the engine oil cools down and the transmission oil is still in the region of the maximum permissible temperature (when driving downhill for prolonged periods in an overrun mode, the internal combustion engine 2a, 2b cools down and the transmission 3 heats up), it is useful to heat the engine oil using the transmission oil by way of the transmission-oil heat exchanger 9. For this purpose, the electrical mixing valve 5 directs the cooling water in the short-circuit line 8 through the transmission-oil/cooling water heat exchanger 9, through which hot transmission oil flows because of the corresponding position of the actuator 18. In this case, the actuator 18 must be electrically operated by a control unit (not shown). In the other operating states, the actuator 18 may be a thermostat, which reacts only to the transmission-oil temperature, i.e. an optimum cooling-circuit control is equipped with an electrically driven actuator 18, but for a somewhat simpler, less expensive arrangement, a thermostat is used as actuator 18. The actuator may also be arranged upstream of the transmission oil cooler 7 and the heat exchanger 9 as indicated in dashed lines and by the reference numeral 18'.

Figure 2:
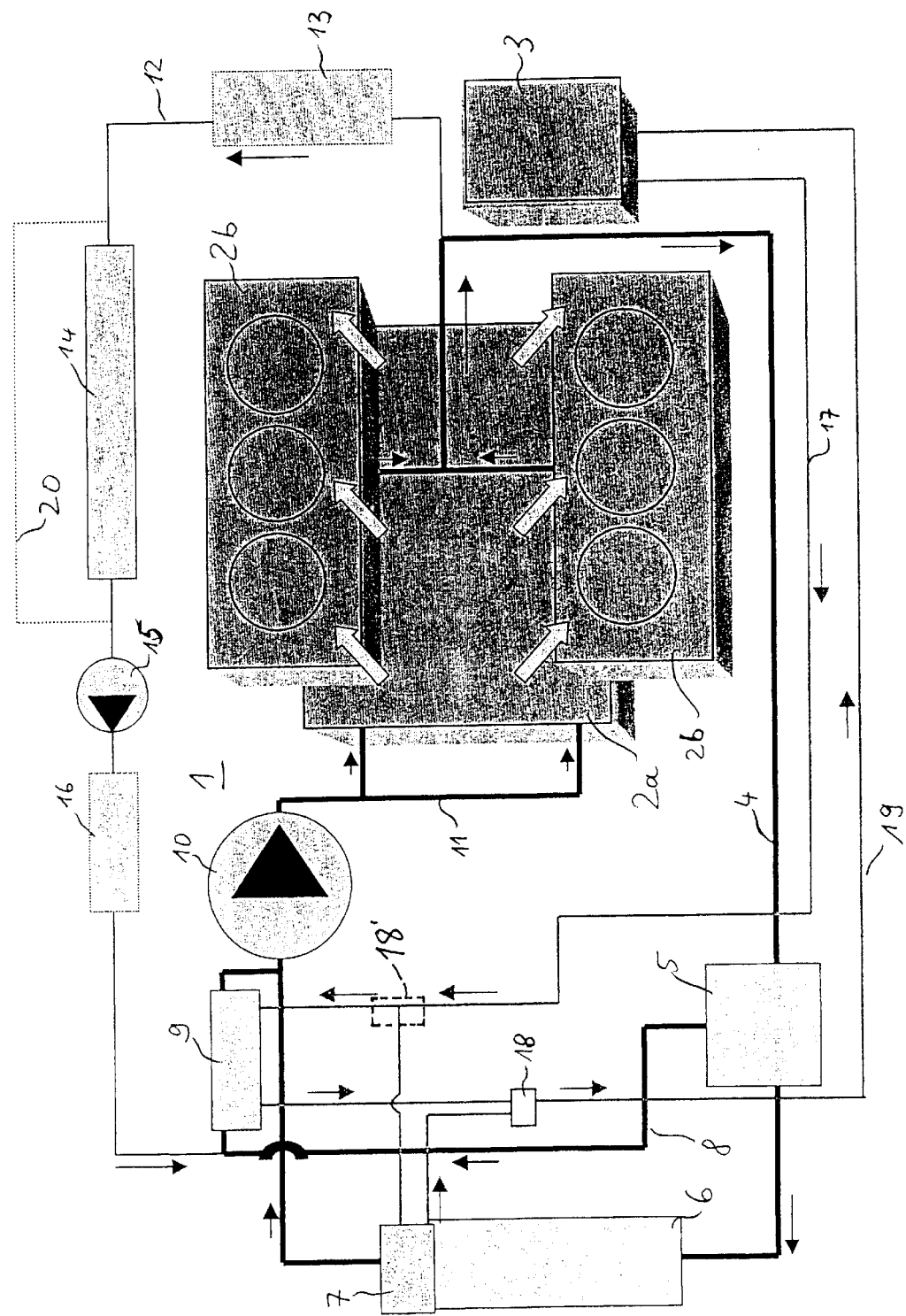
FIG. 2 shows a cooling circuit diagram of an internal combustion engine with a transmission-oil heat exchanger, which is connected in parallel with the radiator and through which cooling water from the heater circuit flows.

FIG. 2 depicts a cooling circuit 1 of an internal combustion engine 2a, 2b with a transmission 3 in a motor vehicle (not shown). The cooling water flows from the engine block 2a of the internal combustion engine, via the cylinder head 2b and the coolant feed line 4, to the electrical mixing valve 5. From the electrical mixing valve 5, the cooling water, depending on the position of the electrical mixing valve, flows either via the radiator 6 and the transmission-oil cooler 7 or in the short-circuit line 8 through the transmission-oil/cooling water heat exchanger 9 to the water pump 10. The water pump 10 is mechanically or electrically driven and is switchable. From there, the cooling water is pumped through the return line 11 to the engine block 2a. Furthermore, the cooling circuit 1 also comprises a heating circuit 12, which branches off at the cylinder head 2b or from the coolant feed line 4, extends through an EGR cooler 13 for cooling exhaust gas which is re-circulated, a heater 14 for heating the vehicle, an optional electrical additional water pump 15, and an engine-oil heat exchanger 16 to the short-circuit line 8 upstream of the transmission-oil/cooling water heat exchanger 9.

A bypass line 20 may be provided so that the heater 14, can be simply bypassed at high outside temperatures when heating of the passenger compartment is not required.

The transmission oil, which is to be cooled is directed via a transmission-oil feed line 17 to the transmission-oil cooler 7 and/or the transmission-oil/cooling water heat exchanger 9. After passing through these two elements, the oil flows are combined in the actuator 18 and the oil flows back to the transmission 3 in the transmission-oil return line 19.

Because the electrical mixing valve 5, the actuator 18, the water pump 10 and the electrical additional water pump 15 are adjustable, different cooling-water and transmission-oil flows can be established as a function of the operating state of the internal combustion engine 1 and of the transmission 3. There are the following operating states: the internal combustion engine 1 and the transmission 3 are cold, i.e. the internal combustion engine and the transmission are in a state, which immediately follows a cold start. In this operating state, the cooling water is stationary or only flows with a low volumetric flow, pumped by the water pump 10 or the electrical additional water pump 15. At the start, the electrical mixing valve 5 is completely closed, and water flows only via the heating circuit 12 if the electrical additional pump 15 is switched on. Heat from the cooling water, of which there is only a small amount, is dissipated via the heater 14 to the vehicle (not shown) and via the engine-oil heat exchanger 16 to the engine oil. The cooling water then flows back via the transmission-oil/cooling water heat exchanger 9 and the water pump 10 to the internal combustion engine 2a, 2b. The sizes and efficiencies of the engine-oil heat exchanger 16 and of the transmission-oil/cooling water heat exchanger 9 are matched to one another in such a way that the transmission-oil heat exchanger only transfers large quantities of heat at relatively high cooling-water volumetric flows. This ensures heating of the engine oil before the transmission oil is heated.

In the other operating areas, this arrangement works in the same way as the cooling circuit shown in FIG. 1.

Figure 3:
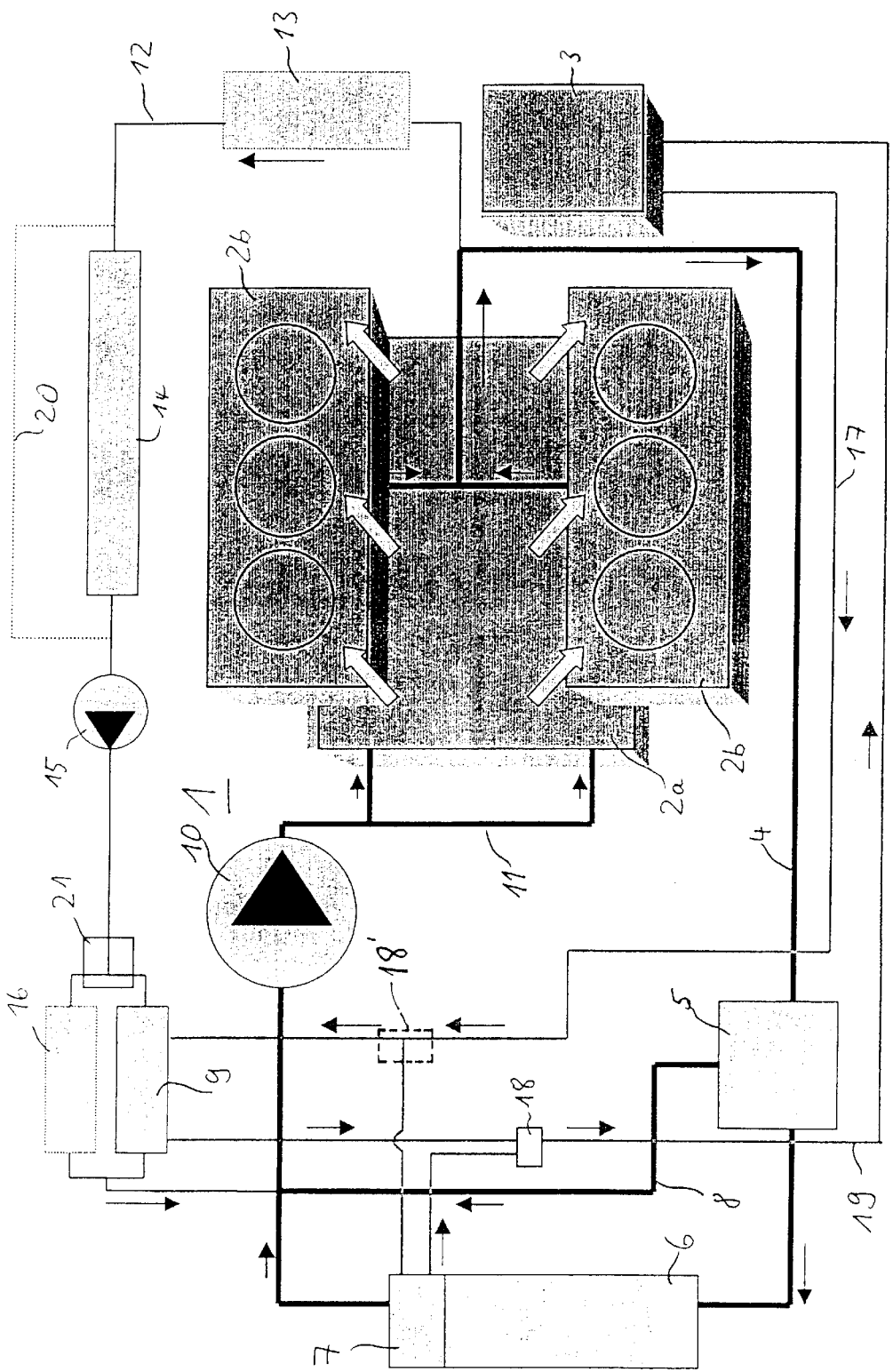
FIG. 3 shows a cooling circuit diagram of an internal combustion engine with a transmission-oil heat exchanger, which is connected in parallel with the engine-oil heat exchanger in the heater circuit.

FIG. 3 diagrammatically depicts a cooling circuit 1 of an internal combustion engine 2a, 2b with a transmission 3 in a motor vehicle (not shown). The cooling water flows from the engine block 2a of the internal combustion engine, via the cylinder head 2b and the coolant feed line 4, to the electrical mixing valve 5. From the electrical mixing valve 5, the cooling water, depending on the position of the electrical mixing valve, flows either via the radiator 6 and the transmission-oil cooler 7 or through the short-circuit 8 to the water pump 10. The water pump 10 is mechanically or electrically driven and is designed to be switchable. From there, the cooling water is pumped through the return line 11 to the engine block 2a. The cooling circuit 1 also comprises a heating circuit 12, which branches off at the cylinder head 2b or from the coolant feed line 4, extends through an EGR cooler 13 for cooling exhaust gas which is recirculated, a heater 14 for heating the vehicle (not shown), an optional electrical additional water pump 15, and a transmission-oil/cooling water heat exchanger 9 with an engine-oil heat exchanger 16 connected in parallel therewith, to the water pump feed line directly upstream of the water pump 10.

The water flow to the transmission-oil/cooling water heat exchanger 9 and of the engine-oil heat exchanger 16 with regard to the heat transfer between engine oil and transmission oil, on the one hand, and cooling water, on the other hand, is determined by means of their size and/or efficiencies or by means of an additional actuator 21, which controls the cooling-water distribution in the heating circuit between the two heat exchangers. The engine-oil temperature is preferably increased by the absorption of heat from the cooling water during a cold start.

A bypass line 20 may be arranged at the heater 14, for bypassing the heater at high outside temperatures when heating of the passenger compartment is not required.

The transmission oil, which is to be cooled, flows via a transmission-oil feed line 17 and is distributed to the transmission-oil cooler 7 and/or the transmission-oil heat exchanger 9. After passing through these two elements, the oil flows are combined in the actuator 18 and returned to the transmission 3 in the transmission-oil return line 19.

Because the electrical mixing valve 5, the actuator 18, the water pump 10 and the electrical additional water pump 15, different cooling-water and transmission-oil flows can be provided as a function of the operating state of the internal combustion engine 1 and of the transmission 3. There are the following operating states: the internal combustion engine 1 and the transmission 3 are cold, i.e. the internal combustion engine and the transmission are in a state which immediately follows a cold start. In this operating state, the cooling water is stationary or only flows with a low volumetric flow, circulated by the water pump 10 or the electrical additional water pump 15. At the start, the electrical mixing valve 5 is completely closed and the water flows only via the heating circuit 12 if the electrical additional pump 15 is switched on. Heat from the cooling water, of which there is only a small amount, is dissipated via the heater 14 to the vehicle (not shown) and via the engine-oil heat exchanger 16 to the engine oil. As the cooling-water temperature rises, the water flow through the transmission-oil/cooling water heat exchanger 9, which is connected in parallel with the engine-oil heat exchanger 16, is switched on. At higher cooling-water temperatures heat is dissipated also to the transmission oil. This ensures that the engine oil is heated at an earlier time than the transmission oil.

As the cooling water is heated further, the electrical mixing valve 5 first opens the short-circuit line 8, and as heating continues it then opens the inlet to the radiator 6. However, this takes place to such a small degree that a large quantity of cooling water and therefore a large quantity of heat continues to be pumped through the engine-oil/cooling water heat exchanger 16 and the transmission-oil heat exchanger 9 in the heating circuit 12.

In the other operating areas, this arrangement behaves in the same way as the cooling circuit shown in FIGS. 1 and 2, i.e. all the actuators and switching options are controlled in such a way that the engine oil is heated first, followed by the vehicle interior and the transmission oil, in this order. If the manufacturer has a different priority with regard to comfort or different statutory requirements with regard to emissions during a cold start, a different heating sequence is, of course, also possible. When the vehicle has been heated to its operating temperature, the entire cooling circuit 1 is connected in such a way that the cooling water, the engine oil and the transmission oil are each maintained at their optimum operating temperature.

Figure 4:
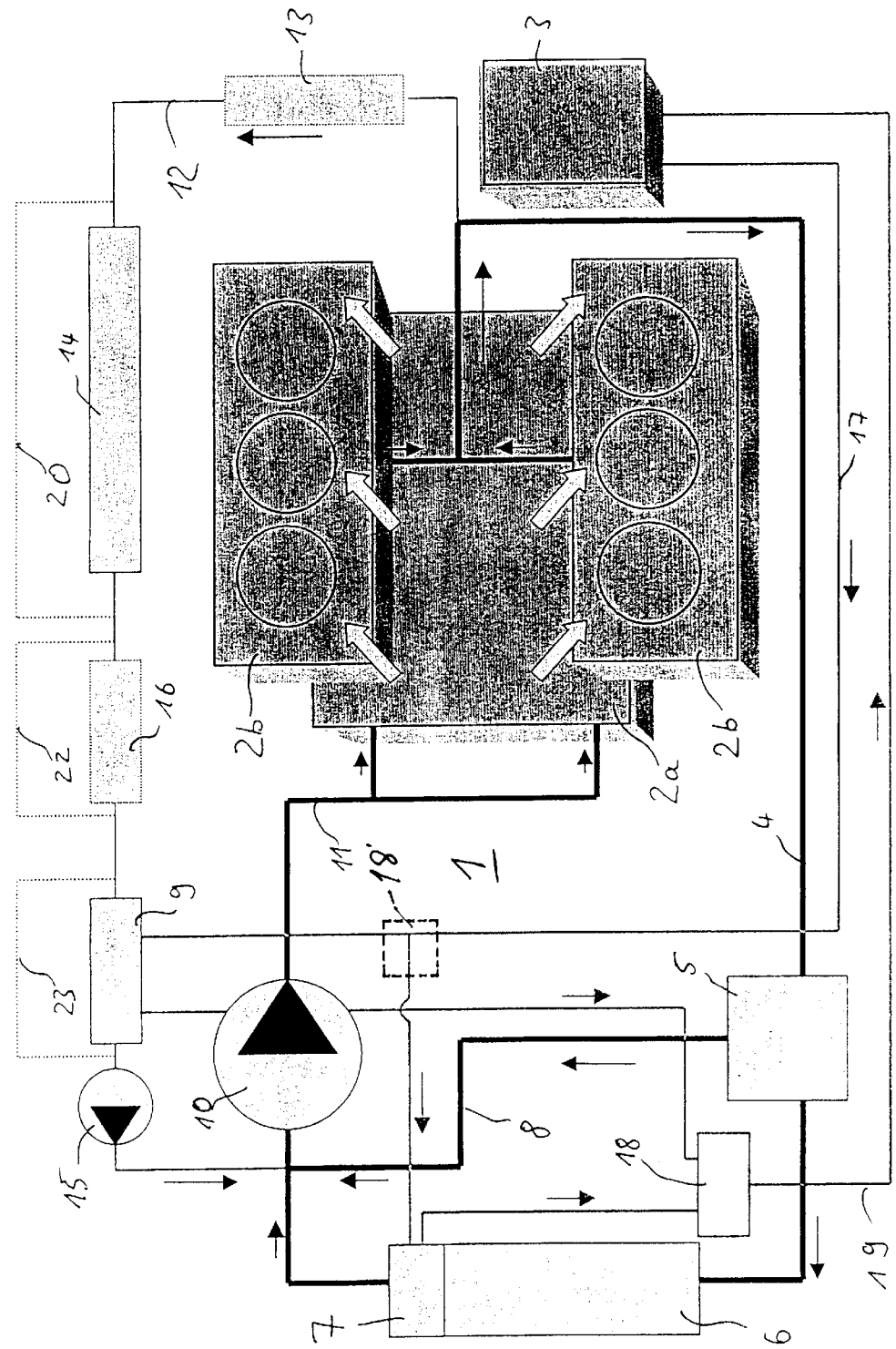
FIG. 4 shows a cooling circuit diagram of an internal combustion engine with a transmission-oil heat exchanger, which is arranged downstream of the engine-oil heat exchanger in the heater circuit.

FIG. 4 diagrammatically depicts a cooling circuit 1 of an internal combustion engine 2a, 2b with a transmission 3 in a motor vehicle (not shown). The cooling water flows from the engine block 2a of the internal combustion engine, via the cylinder head 2b and the coolant feed line 4, to the electrical mixing valve 5. From the electrical mixing valve 5, the cooling water, depending on the position of the electrical mixing valve 5, flows either via the radiator 6 and the transmission-oil cooler 7 or the short-circuit line 8 to the water pump 10. The water pump 10 is mechanically or electrically driven and is designed to be switchable. From there, the cooling water is pumped through the return line 11 to the engine block 2a. Furthermore, the cooling circuit 1 also comprises a heating circuit 12, which branches off at the cylinder head 2b or from the coolant feed line 4, extends through an EGR cooler 13 for cooling exhaust gas which is to be recirculated, a heater 14 for heating the vehicle (not shown), an optional electrical additional water pump 15, and an engine-oil heat exchanger 16 having a transmission-oil/cooling water heat exchanger 9 connected in series therewith, to the pump feed line directly upstream of the water pump 10.

The water flow to the transmission-oil/cooling water heat exchanger 9 and to the engine-oil heat exchanger 16 with regard to the heat transfer between engine oil and transmission oil, on the one hand, and cooling water, on the other hand, is determined by means of their size and/or efficiencies of the heat exchangers. The engine-oil temperature is increased by the absorption of heat from the cooling water during a cold start.

A bypass line 20 may be arranged at the heater 14 for bypassing the heater 14 at high outside temperatures when heating of the passenger compartment is not required.

Furthermore, two bypass lines 22, 23 may be provided bypassing the engine-oil heat exchanger 16 and the transmission-oil heat exchanger 19. These bypass lines 22, 23 are used when the cooling water, engine oil and transmission oil are hot since then there is no need for heat to be transferred between the media and the flow resistance in the the heat exchangers 9, 16 is avoided.

The transmission oil which is to be cooled flows via a transmission-oil feed line 17 and is distributed to both the transmission-oil cooler 7 and/or the transmission-oil/cooling water heat exchanger 9. After passing through these two elements, the oil flows are combined in the actuator 18 and returned to the transmission 3 in the transmission-oil return line 19.

Because of the electrical mixing valve 5, the actuator 18, the water pump 10 and the electrical additional water pump 15 are adjustable, different cooling-water and transmission-oil flows can be established as a function of the operating state of the internal combustion engine 1 and of the transmission 3. There are the following operating states: the internal combustion engine 1 and the transmission 3 are cold, i.e. the internal combustion engine and the transmission are in a state immediately following a cold start. In this operating state, the cooling water is stationary or only flows with a low volumetric flow pumped by the water pump 10 or the electrical additional water pump 15. At the start, the electrical mixing valve 5 is completely closed and water flows only through the heating circuit 12 if the electrical additional pump 15 is switched on. Heat from the cooling water, of which there is only a small amount, is dissipated via the heater 14 to the vehicle interior (not shown) and via the engine-oil heat exchanger 16 to the engine oil. As the cooling-water temperature rises, the transmission-oil/cooling water heat exchanger 9, which is connected in series with the engine-oil heat exchanger 16, transmits heat also to the transmission oil. This ensures that the engine oil is heated before the transmission oil. In this early cold-starting phase, it is possible to bypass the transmission-oil heat exchanger 9 via the bypass line 23, in order to heat the engine cooling water and the engine oil even more quickly.

As the cooling water is heated further, the electrical mixing valve 5 first opens the short-circuit line 8, and as heating continues it then opens the inlet to the radiator 6. However, this takes place to such a small degree that a large quantity of cooling water and therefore a large quantity of heat continues to be pumped through the engine-oil heat exchanger 16 and the transmission-oil/cooling water heat exchanger 9 in the heating circuit 12.

In the other operating areas, this arrangement acts in the same way as the cooling circuit shown in FIG. 3, i.e. all the actuators and switching options are controlled in such a way that the engine oil is heated first, followed by the vehicle interior and the transmission oil, in this order. If the manufacturer has a different priority with regard to comfort or different statutory regulations with regard to emissions during a cold start, a different heating sequence is, of course, also possible. When the vehicle has been heated to its operating temperature, the entire cooling circuit 1 is connected in such a way that the cooling water, the engine oil and the transmission oil are all maintained at their optimum operating temperatures.

What is claimed is:

1. A cooling circuit of a liquid cooled internal combustion engine (2a, 2b) with a transmission (3) of a motor vehicle, said cooling circuit (1) comprising a pump (10) for delivering cooling water to said engine (2a, 2b), a cooling water circulating line (4) connected to said engine (2a, 2b) and including an electrical valve (5) for selectively directing cooling water either to a radiator (6) or a transmission oil/cooling water heat exchanger (9), lines connecting the inlet of the pump (10) to the outlets of the transmission/cooling water heat exchanger (9) and the radiator (6), a transmission oil circulation line connected to an outlet of said transmission and extending to a controlled valve (18) for selectively conducting the transmission oil through the transmission oil/cooling water heat exchanger (9) or a transmission oil cooler (7) of the radiator (6) before returning it to the transmission through a return line (19) extending to the transmission (9) and a heater circuit extending from the engine to the pump (10) and including a vehicle heater (14) and an engine oil heater (16) arranged in the heater circuit downstream of the vehicle heater (14).

2. A cooling circuit according to claim 1, wherein said controlled valve (18) is arranged downstream of the transmission-oil cooler (7) and the transmission-oil/cooling water heat exchanger (9).

3. A cooling circuit according to claim 1, wherein said controlled valve (18) is arranged upstream of the transmission-oil cooler (7) and the transmission-oil/cooling water heat exchanger (9).

4. A cooling circuit according to claim 1, wherein a cooling-water side of the transmission-oil/cooling water heat exchanger (9) is connected in a parallel flow circuit with the radiator (6).

5. A cooling circuit according to claim 1, wherein an EGR cooler (13) is arranged in the heater circuit upstream of said heater (14).

6. A cooling circuit of a liquid-cooled internal combustion engine (2a, 2b) with a transmission of a motor vehicle, said cooling circuit (1) comprising, a pump for delivering cooling water to said engine (2a, 2b), a cooling water circulating line (4) connected to said engine (2a, 2b) and including an electrical valve (5) for selectively directing cooling water either to a radiator (6) or a transmission oil/cooling water heat exchanger (9), lines connecting the inlet of the pump (10) to the outlets of the transmission oil/cooling water heat exchanger (9) and the radiator (6), a transmission oil circulation line connected to an outlet of the transmission and extending to a controlled valve (18) for selectively conducting the transmission oil through the transmission oil/cooling water heat exchanger (9) or a transmission oil cooler (7) of the radiator (6) before returning it to the transmission through a return line (19) extending to the transmission (3) and a heater circuit extending from the engine (2a, 2b) to the pump (10) and including a vehicle heater (14) and an engine oil heater (16) and also the transmission oil/cooling water heat exchanger (9), which is arranged in the heater circuit downstream of the vehicle heater (14).

7. A cooling circuit according to claim 6, wherein the engine oil heater (16) and the transmission oil/cooling water heat exchanger (9) are arranged in the heater circuit in parallel and an actuator is provided for controlling the cooling water flow through the engine oil heater (16) and the transmission oil/cooling water heat exchanger (9).

8. A cooling circuit according to claim 6, wherein an EGR cooler (13) is arranged in the heater circuit upstream of said heater (14).

* * * * *